United States Patent
Yamaguchi et al.

(10) Patent No.: US 7,905,541 B2
(45) Date of Patent: Mar. 15, 2011

(54) REAR VEHICLE BODY STRUCTURE

(75) Inventors: Toshizumi Yamaguchi, Wako (JP); Satoru Kawabe, Wako (JP); Takumi Tsuyuzaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 149 days.

(21) Appl. No.: 12/439,772

(22) PCT Filed: Jul. 26, 2007

(86) PCT No.: PCT/JP2007/064680
§ 371 (c)(1),
(2), (4) Date: Mar. 3, 2009

(87) PCT Pub. No.: WO2008/029559
PCT Pub. Date: Mar. 13, 2008

(65) Prior Publication Data
US 2010/0052368 A1 Mar. 4, 2010

(30) Foreign Application Priority Data
Sep. 4, 2006 (JP) ................................. 2006-238422

(51) Int. Cl.
*B60J 7/00* (2006.01)
(52) U.S. Cl. ................................. 296/203.04
(58) Field of Classification Search ............ 296/203.04, 296/204, 187.08, 187.11, 193.07, 193.08, 296/37.2; 280/781, 281.1, 834; 180/219, 180/312, 291, 311
See application file for complete search history.

(56) References Cited

U.S. PATENT DOCUMENTS

| | | | |
|---|---|---|---|
| 2,047,336 A * | 7/1936 | Stout | 180/62 |
| 4,163,578 A * | 8/1979 | Watson | 296/204 |
| 5,114,184 A * | 5/1992 | Shimomura et al. | 280/784 |
| 6,053,566 A * | 4/2000 | Aghssa et al. | 296/187.11 |
| 6,834,910 B2 | 12/2004 | Wendland et al. | |
| 7,032,961 B2 * | 4/2006 | Matsuda | 296/204 |
| 7,090,290 B2 * | 8/2006 | Neumeier et al. | 296/204 |
| 7,270,365 B2 * | 9/2007 | Suzuki et al. | 296/187.08 |
| 7,270,369 B2 * | 9/2007 | Okana et al. | 296/204 |
| 7,427,098 B2 * | 9/2008 | Kobayashi et al. | 296/203.04 |
| 7,552,963 B2 * | 6/2009 | Yamaguchi et al. | 296/187.08 |
| 7,568,755 B2 * | 8/2009 | Imada et al. | 296/187.11 |
| 7,784,858 B2 * | 8/2010 | Abe et al. | 296/203.04 |
| 2009/0001767 A1* | 1/2009 | Yamaguchi et al. | 296/203.04 |
| 2009/0096253 A1* | 4/2009 | Yatsuda | 296/193.09 |
| 2009/0195030 A1* | 8/2009 | Yamaguchi et al. | 296/193.08 |

* cited by examiner

*Primary Examiner* — Kiran B. Patel
(74) *Attorney, Agent, or Firm* — Rankin, Hill & Clark LLP (57) ABSTRACT

A rear vehicle body structure including: a cross member which is connected between right and left rear frames extending in the front-rear direction of a vehicle body, the cross member being provided with suspension mounting parts for supporting suspensions of right and left rear wheels; spare pan frames for supporting a spare pan, the spare pan frames being connected to the cross member and extend rearward of the vehicle body from the cross member; and a pair of right and left tank frames which is connected in the vicinity of a center portion of the cross member in the right and left direction of the vehicle body, each of the pair of right and left tank frames extending in the vehicle front-right direction or the vehicle front-left direction from the cross member and being connected to a right or left floor frame or a right or left side sill.

10 Claims, 9 Drawing Sheets

REAR VEHICLE BODY STRUCTURE

CROSS REFERENCE TO RELATED APPLICATIONS

This application claims the foreign priority benefit under 35 U.S.C. §119 of Japanese Patent Application No. 2006-238422 filed on Sep. 4, 2006, the disclosure of which is incorporated herein by reference.

FIELD OF THE INVENTION

The present invention relates to a rear vehicle body structure.

DESCRIPTION OF THE RELATED ART

Conventionally, a rear vehicle body structure has been known which is, for example, disclosed in the patent document 1. In the rear vehicle body structure, a rear end of a support which is disposed in the front-rear direction of the vehicle body is connected to a cross support disposed at the rear end of the vehicle body, and a front end of the support is connected to a receiving bracket that is disposed on the front side of the support in the right and left direction of the vehicle body. A pair of compression bars, which extend vehicle frontward in a v shape in a plain view, is further connected to the receiving bracket. Front ends of the pair of compression bars are connected to right and left side sills respectively, which are disposed in the front and rear direction of the vehicle body.

In such a rear vehicle body structure, the cross support provided at the rear end of the vehicle body is connected to the right and left side sills via the support, the receiving bracket, and the compression bars to reinforce the rear vehicle body.
Patent document 1 U.S. Pat. No. 6,834,910

In such a rear vehicle body structure disclosed in U.S. Pat. No. 6,834,910, the support that is connected between the cross support and the receiving bracket is inclined downward from the cross support to the receiving bracket.

Thus, if a load is input to the cross support at the time of rear end collision, the input load is not efficiently transferred from the cross support to the receiving bracket through the support, which causes a problem that it is difficult to disperse the input load to the side sills from the receiving bracket through the compression bars.

A general rear vehicle body structure includes suspension mounting parts to which suspensions are mounted. A load applied to a wheel via the suspension is also applied to the suspension mounting parts. Therefore, it has been desired to increase the strength of the suspension mounting parts so that the rigidity of the suspension mounting parts is enhanced.

In such a rear vehicle body structure disclosed in U.S. Pat. No. 6,834,910, however, the receiving bracket and the suspension mounting parts for the right and left rear wheels are independently provided on the floor of the rear part of the vehicle body. Thus, there has been a problem that the receiving bracket does not contribute to the rigidity of the suspension mounting parts for the right and left rear wheels.

SUMMARY OF THE INVENTION

The present invention has been made in view of the above problem, and an object thereof is to provide a rear vehicle body structure that enables to disperse a load input at the time of rear end collision, and to enhance the rigidity of suspension mounting parts.

The present invention for achieving the above object provides a rear vehicle body structure including: a cross member which is connected between right and left rear frames extending in the front-rear direction of a vehicle body, the cross member being provided with suspension mounting parts for supporting suspensions of right and left rear wheels; spare pan frames for supporting a spare pan, the spare pan frames being connected to the cross member and extend rearward of the vehicle body from the cross member; and a pair of right and left tank frames which is connected in the vicinity of a center portion of the cross member in the right and left direction of the vehicle body, each of the pair of right and left tank frames extending in the vehicle front-right direction or the vehicle front-left direction from the cross member and being connected to a right or left floor frame or a right or left side sill.

In accordance with the present invention, if a load is input to a rear end part which is formed by a rear end cross member and a rear end outrigger, the input load is transferred to the cross member through the spare pan frames. The input load is further transferred to the right and left floor frames or the side sills through the pair of right and left tank frames, each of which extends in the vehicle front-right direction or the vehicle front-left direction from the cross member.

Therefore, the load generated at the time of the rear end collision is efficiently dispersed and transferred frontward from the rear part of the vehicle body, which enhances the energy absorbing effect at the time of the rear end collision.

In the rear vehicle body structure, since the spare pan frames extend rearward from the cross member, and the pair of right and left tank frames extend frontward from the cross member, the cross member is reinforced by the spare pan frames and the pair of right and left tank frames, whereby the rigidity of the cross member is enhanced. This configuration also enables to enhance the rigidity of the suspension mounting parts provided to the cross member.

In the present invention, the spare pan frames and the pair of right and left tank frames are disposed on a substantially straight line via the cross member in the vehicle front rear direction in a side view.

The liner arrangement of the spare pan frames and the pair of right and left tank frames includes an arrangement where the spare pan frames and the pair of right and left tank frames are disposed with a step therebetween, through which a load input at the time of rear end collision can be transferred to the pair of right and left tank frames from the spare pan frames via the cross member.

In accordance with the present invention, since the spare pan frames and the pair of right and left tank frames are disposed on the substantially straight line via the cross member in the vehicle front-rear direction in a side view, a load input at the time of rear end collision is smoothly dispersed and transferred frontward from the rear part of the vehicle body, whereby the energy absorbing effect at the time of rear end collision can be further enhanced.

Further, deformation of the vehicle body in the front-rear direction of the vehicle body can be preferably suppressed, which enhances the rigidity of the lower arm supporting parts provided to the cross member. Furthermore, larger capacity of the spare pan can be ensured.

In the present invention, the spare pan frames are provided on both right and left sides of the spare pan.

In accordance with the present invention, since the spare pan frames are provided on both right and left sides of the spare pan, a load input, for example, through the rear end part which is formed by the rear end cross member and the rear end outrigger is efficiently dispersed and transferred frontward from the rear part of the vehicle body, which enhances the energy absorbing effect at the time of rear end collision.

Further, deformation of the vehicle body in the front-rear direction of the vehicle body can be preferably suppressed, which enhances the rigidity of the lower arm supporting parts provided to the cross member.

In the present invention, the spare pan frames support the spare pan from outside or inside of the spare pan.

In accordance with the present invention, if the spare pan frames support the spare pan from outside of the spare pan, it is possible to realize the rear vehicle body structure in which a load input at the time of rear end collision is efficiently dispersed and transferred frontward from the rear part of the vehicle body without sacrificing the capacity of the spare pan.

A configuration in which the spare pan frames support the spare pan from right and left outer sides of the spare pan allows to increase the capacity of the spare pan while maintaining the minimum ground clearance and to lower the center of gravity of the vehicle body, compared with a configuration in which the spare pan frames support the spare pan from the outer bottom surface of the spare pan. The configuration in which the spare pan frames support the spare pan from the outer bottom surface of the spare pan allows to effectively utilize spaces on sides of the spare pan. Moreover, if there is a space on the outer bottom side of the spare pan, it is possible to effectively utilize the space.

A configuration in which the spare pan frames support the spare pan from inside of the spare pan allows to improve aerodynamic characteristics because the spare pan frames do not extend outside of the spare pan. Further, this configuration allows to easily maintain the minimum ground clearance and to lower the center of gravity of the vehicle body.

In the present invention, the spare pan frames and the pair of right and left tank frames are disposed on a substantially straight line via the cross member in the vehicle front-rear direction in a side view, and the spare pan frames support the spare pan from outside or inside of the spare pan.

In accordance with the present invention, a configuration in which the spare pan frames support the spare pan from the outer bottom surface of the spare pan allows to reduce the offset amount between the spare pan frames and the pair of right and left tank frames in the upper and lower direction because the spare pan frames are disposed at lower portions of the sides or on the outer bottom surface of the spare pan. This further allows to efficiently and smoothly disperse and transfer a load input at the time of rear end collision frontward form the rear part of the vehicle body. Thus, the energy absorbing effect at the time of rear end collision can be further enhanced.

In the present invention, connection positions of front ends of the spare pan frames to the cross member correspond to lower arm supporting positions which are suspension mounting parts.

In accordance with the present invention, the supporting rigidity of lower arms is enhanced since the front ends of the spare pan frames are connected to the lower arms, although there is a distance between the lower arms and the main frames such as the cross member and the rear frames. This further enhances steering stability.

In the present invention, front ends of the pair of right and left tank frames are connected to a floor cross member which is connected between the right and left rear frames or side sills, and the pair of right and left tank frames are connected to the right and left rear frames or side sills via the floor cross member.

In accordance with the present invention, if a load is input to the spare pan frames via the rear end part at the time of rear end collision for example, the input load is transferred to the cross member through the spare pan frames, and is further transferred to the floor cross member from the cross member through the pair of right and left tank frames. The input load is further transferred from the floor cross member to the right and left rear frames or side sills.

Thus, the load input at the time of the rear end collision is efficiently dispersed and transferred frontward from the rear part of the vehicle body, whereby the energy absorbing effect at the time of rear end collision is enhanced.

Since the pair of right and left tank frames is connected to the floor cross member, the connection positions of the pair of right and left tank frames may be designed to be closer to the center part of the vehicle body, which increases the degree of freedom for a layout of members disposed in the vehicle rear part.

In the present invention, floor frames are connected to positions corresponding to the connection positions of the pair of right and left tank frames to the floor cross member.

In accordance with the present invention, a load transferred to the floor cross member through the pair of right and left tank frames at the time of rear end collision is further transferred to the floor frames from the floor cross member, which allows to efficiently disperse and transfer the load input at the time of the rear end collision. Thus, the energy absorbing effect at the time of rear end collision can be further enhanced.

In the present invention, the rear ends of the spare pan frames are connected to a rear end part in which a rear end cross member and a rear end outrigger are integrally connected.

In accordance with the present invention, because the rear end part forms a surface which faces toward the rear side of the vehicle body, an input load can be dispersed into two lines at the time of rear end collision including an offset rear end collision. The two lines are a line where the input load is transferred to the spare pan frames and a line where the input load is transferred to the rear frames. Thus, the energy absorbing effect at the time of rear end collision can be further enhanced.

In accordance with the present invention, a rear vehicle body structure is realized which enables to disperse a load input at the time of rear end collision and to improve the rigidity of the suspension mounting parts for right and left rear wheels.

DESCRIPTION OF REFERENCE NUMERALS

1 Vehicle
2 Rear frame
2a End of curved portion
3 Middle cross member
4 Rear floor panel
5 Spare pan
5a Side portion
5b Bottom surface
10 Cross member
11 Spring supporting part
12 Lower arm supporting part
30 Tank frame
T Fuel tank

DETAILED DESCRIPTION OF EMBODIMENTS

A rear vehicle body structure according to an embodiment of the present invention is described in detail below with reference to the accompanying drawings. In the following explanation, terms indicating directions such as "front-rear", "right-left" and "up-down" are based on directions of a vehicle body to which a cross member is attached, which comprises the rear vehicle body structure.

Figure 1:
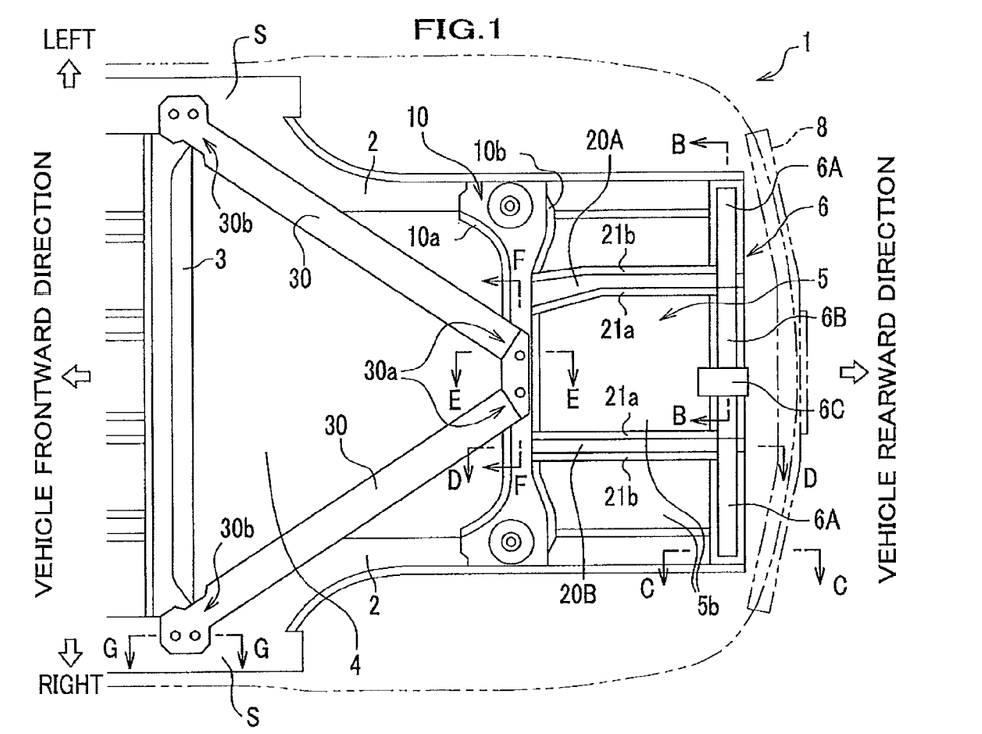
FIG. 1 is a bottom plan view of a rear vehicle body structure according to an embodiment of the present invention.
Figure 2:
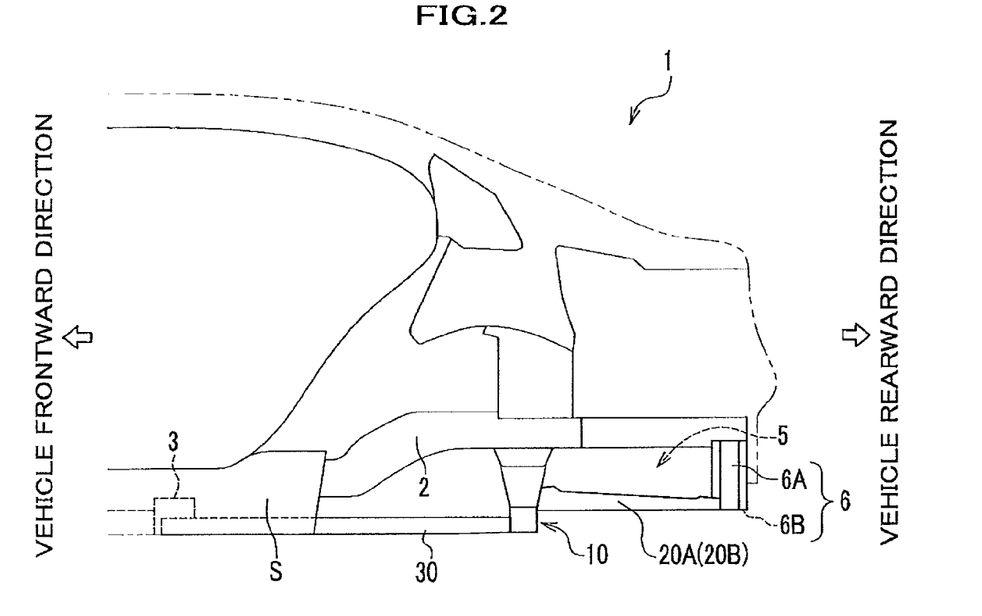
FIG. 2 is a side view showing a rear part of a vehicle body including the rear vehicle body structure.
Figure 3:
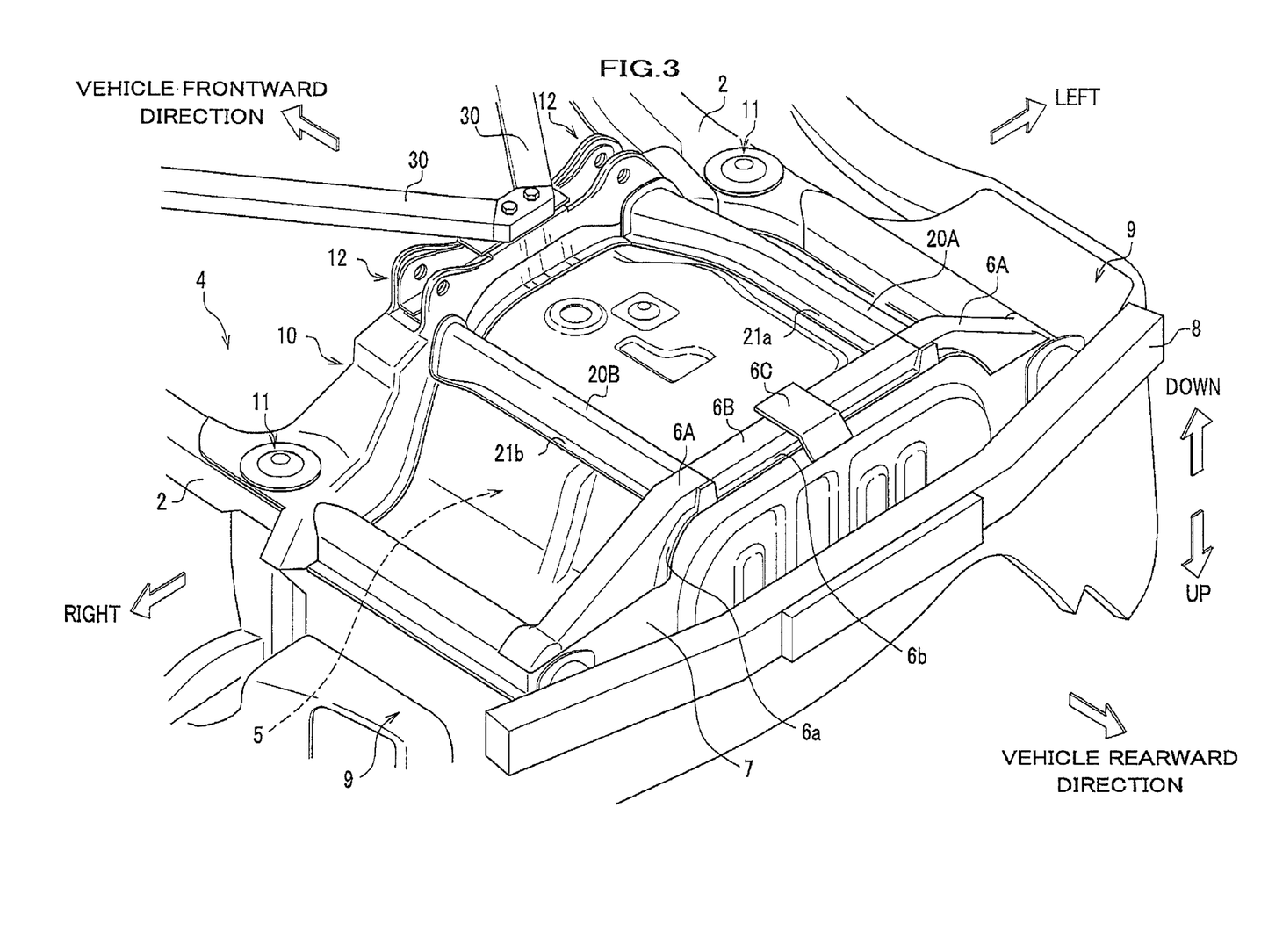
FIG. 3 is a perspective view of the rear vehicle body structure seen from the bottom of the structure.

FIG. 1 is a bottom plain view showing the rear vehicle body structure according to the embodiment of the present invention. FIG. 2 is a side view showing a rear part of a vehicle body including the rear vehicle body structure. FIG. 3 is a perspective view of the rear vehicle body structure seen from the bottom of the structure.

Firstly, a rear part of a vehicle to which the rear vehicle body structure is applied is briefly explained referring to FIGS. 1 and 2.

A rear vehicle body of a vehicle 1 includes a pair of right and left rear frames 2, 2 which extend in the front-rear direction of the vehicle body, a cross member 10 which is connected between the rear frames 2, 2, spare pan frames 20A, 20B which are connected to the cross member 10 and extend rearward of the vehicle body from the cross member 10, and a pair of right and left tank frames 30, 30, which are connected to the cross member 10 and extend in the front right direction and front left direction of the vehicle body, respectively.

A middle cross member (floor cross member) 3 is connected between side sills S, S which are disposed at the front sides of the rear frames 2, 2. A rear floor panel 4 extends backward of the vehicle body from the middle cross member 3. A spare pan 5 for storing a spare tire (not shown) is recessedly formed in the rear portion of the rear floor panel 4 (see FIG. 1).

Each component is described below in detail.

As shown in FIG. 1, the rear frames 2, 2 are channel shaped members whose top surfaces are open, and flange portions (not shown) provided at the top ends of the rear frames 2, 2 are welded to the bottom surface of the rear floor panel 4. An end cross member 6B is welded to the rear ends of the rear frames 2, 2 via end outriggers 6A, 6A to form a rear end part 6. The end outriggers 6A, 6A and the end cross member 6B are channel shaped members whose top surfaces are open, and flange portions 6a, 6b provided at the top ends of the outriggers 6A, 6A and the end cross member 6B (see FIG. 3) are welded to the rear end of the bottom surface of the rear floor panel 4.

Disposed further rearward of the end outriggers 6A, 6A and the end cross member 6B is a rear panel 7 which is welded to the rear end of the rear floor panel 4 as shown in FIG. 3. The rear panel 7 forms the back wall of a trunk room (not shown). A bumper beam 8 which extends in the right-left direction of the vehicle body is fastened to the right and left sides of the rear surface of the rear panel 7 via a bumper beam extension 8a (see FIG. 5C) with bolts.

Rear side panels 9 are welded to the right and left edges (not shown) of the rear floor panel 4 and the rear panel 7. A stiffening member 6C is provided at the substantially lower center part of the end cross member 6B.

As shown in FIGS. 1 to 3, spare pan frames 20A, 20B are disposed parallel or horizontal to the rear frames 2, 2, and are welded between the cross member 10 and the end cross member 6B. The spare pan frames 20A, 20B are channel shaped members whose top surfaces are open (see FIG. 5A). Flange portions 21a, 21b (see FIGS. 1 and 3. In FIG. 3, only the flange portion 21a is shown.) provided at the top ends of the spare pan frames 20A, 20B are welded to a bottom surface 5b of the spare pan 5.

Figure 4A:
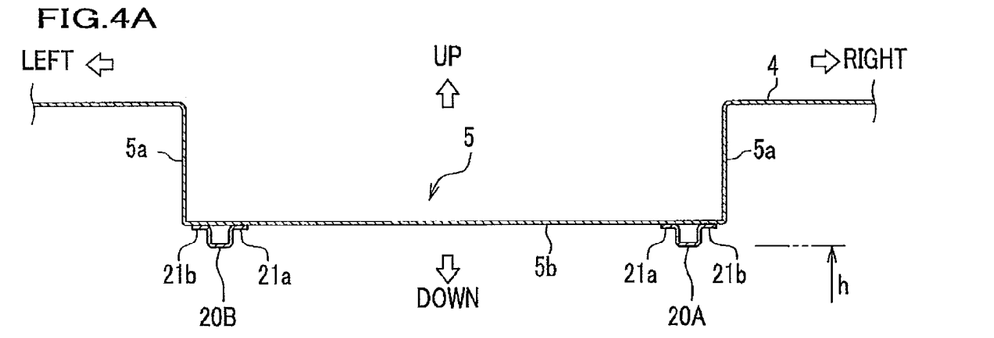
FIGS. 4A to 4D are cross sectional views showing positions to which spare pan frames are fixed.

In the embodiment, as shown in FIG. 4A, the spare pan frames 20A, 20B are disposed in the vicinity of right and left edges of the bottom surface 5b of the spare pan 5 and supports the spare pan 5 from the outside of the spare pan 5. This configuration allows to attain high supporting rigidity without sacrificing the capacity of the spare pan 5.

Furthermore, this configuration also makes it possible to efficiently use a space on the bottom surface side of the spare pan 5.

Figure 4B:
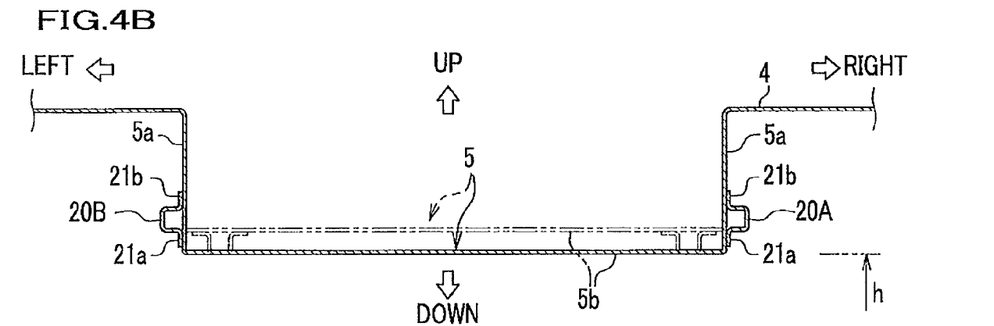
Figure 4C:
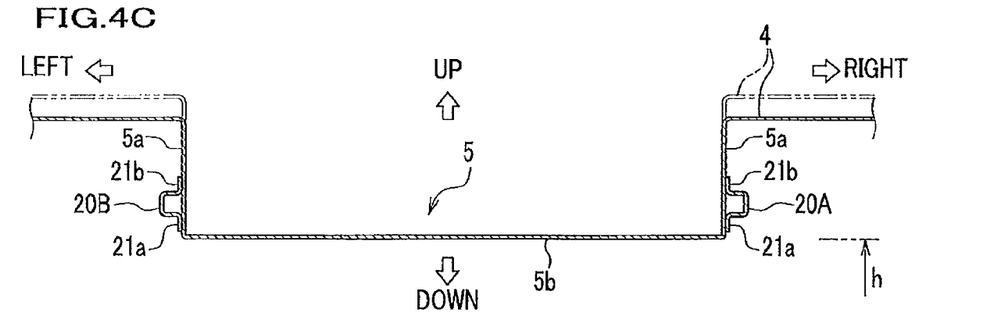
Figure 4D:
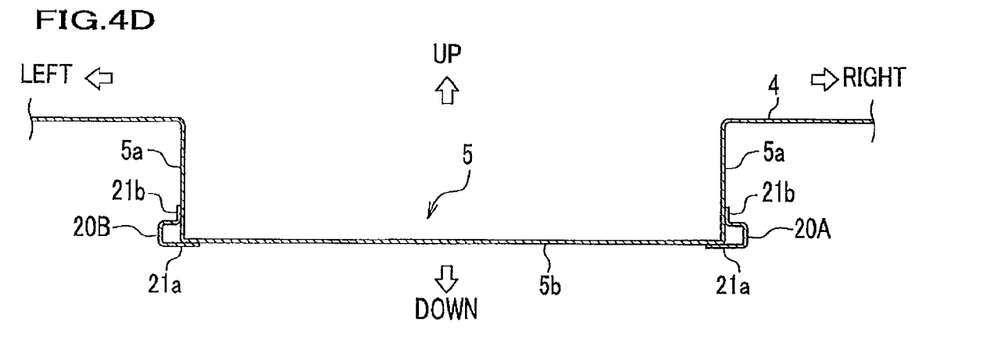

The position in which the spare pan frames 20A, 20B support the spare pan 5 may be changed as shown in FIGS. 4B to 4D.

In the example shown in FIG. 4B, the spare pan frames 20A, 20B are fixed to side portions 5a of the spare pan 5 so that the spare pan frames 20A, 20B support the spare pan 5 from the side portions 5a. As shown by the two dot chain lines in FIG. 4B, this configuration allows to utilize the space which had been occupied by the thickness of the spare pan frames 20A, 20B if the spare pan frames 20A, 20B were provided on the bottom surface 5b, whereby the bottom surface 5b can be expanded downward. Thus, it is possible to increase the capacity of the spare pan 5. To be more specific, this configuration allows to increase the capacity of the spare pan 5 without changing the minimum ground clearance h. This configuration also makes it possible to effectively utilize spaces on the sides of the spare pan 5.

As shown in FIG. 4C, it is possible to lower the position of the entire spare pan 5 till the minimum ground clearance h if the capacity of the spare pan 5 is not increased. This allows to realize a low center of gravity, which contributes to the improvement of driving performance.

In the examples shown in FIGS. 4A to 4C, workability of the welding is improved since the welding directions of the flange portions 21a, 21b of the spare pan frames 20A, 20B are the same.

As shown in FIG. 4D, the welding directions of the flange portions 21a, 21b may be made different, and the flange portions 21a of the spare pan frames 20A, 20B may be welded to the bottom surface 5b. This configuration allows to facilitate the welding work since the flange portions 21a are exposed to the lower side of the vehicle body.

Figure 5A:
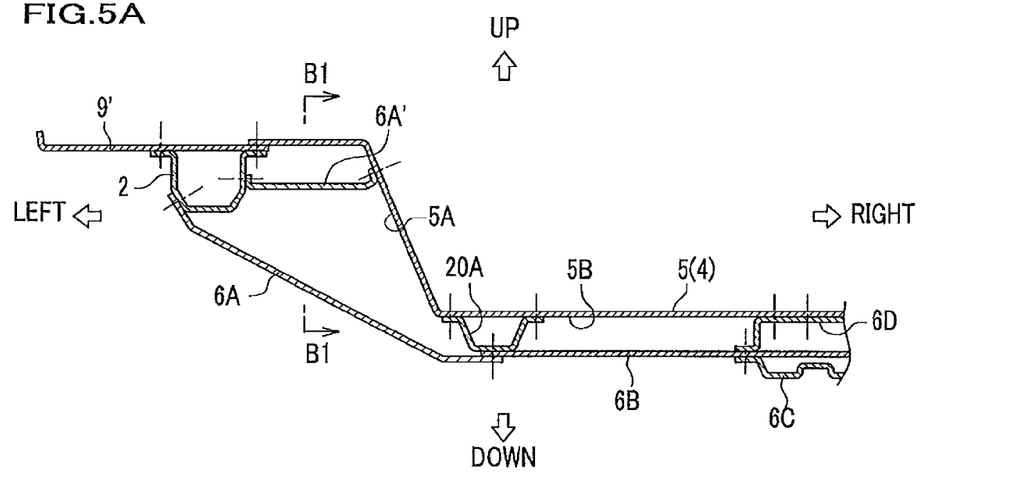
FIG. 5A is a cross sectional view of the rear vehicle body structure along B-B line in FIG. 1.

Next, with reference to FIG. 5A, a welding structure of the left rear end of the vehicle body is described. The portions indicated by the dashed lines in FIG. 5A are welded portions. The spare pan frame 20A is welded to the bottom surface 5b of the spare pan 5, which forms a closed cross section. The end cross member 6B and the end outrigger 6A are superposed and welded to the lower side of the spare pan frame 20A. An end of the end outrigger 6A extends to the rear frame 2 and is welded thereto. A plate 6A welded to the end outrigger 6A (see FIG. 5B) is welded between the side portion 5a of the spare pan 5 and the rear frame 2. In the rear vehicle body, a floor side stiffener 9' is disposed on the rear frame 2 and welded thereto as shown in FIG. 5A. An end of the floor panel 4 is disposed on the top surface of the floor side stiffener 9' and is welded thereto. A supporting member 6d is welded between the end cross member 6B and the bottom surface 5b of the spare pan 5. A stiffening member 6c is welded to a position that corresponds to the position where the supporting member 6d is welded.

Figure 5B:
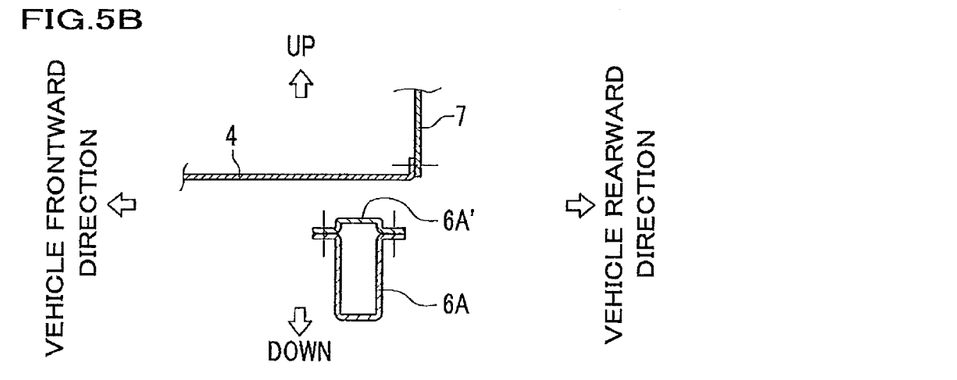
FIG. 5B is a cross sectional view of the rear vehicle body structure along B1-B1 line.

As shown in FIG. 5B, a rear panel 7 is welded to the rear end of the rear floor panel 4.

Figure 5C:
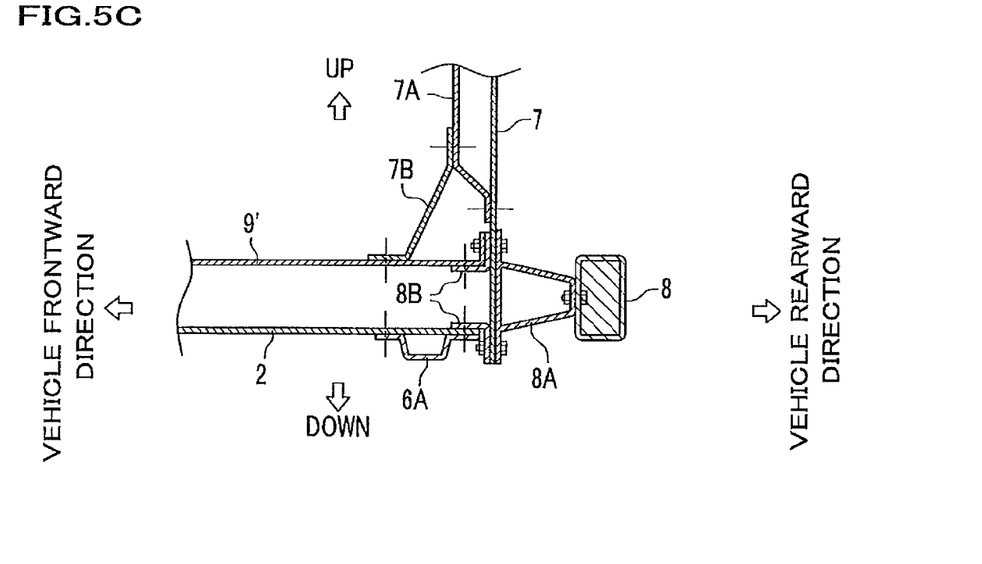
FIG. 5C is a cross sectional view of the rear vehicle body structure along C-C line in FIG. 1.

As shown in FIG. 5C, a rear panel side stiffener 7a is welded to the rear panel 7, and a gusset 7b is welded between the rear panel side stiffener 7a and the floor side stiffener 9'. A bumper beam extension 8a is fastened to the rear end of the rear frame 2 via stiffeners 8b, 8b with bolts. Further, the bumper beam 8 is fastened to the rear end of the rear frame 2 via the bumper beam extension 8a with bolts.

Next, a cross member 10 is described which is disposed at the substantially center of a rear floor in the front-rear direction of the vehicle body. As shown in FIGS. 1 to 3, the cross member 10 is a channel shaped member whose top surface is open (see FIG. 6A). As described above, the cross member 10 is welded between the rear frames 2, 2, and each of flange portions 10a, 10b (see FIG. 6A) provided at the top end of the cross member 10 is welded to the bottom surface of the rear floor panel 4. In the embodiment, the cross member 10 is disposed over the front end of the bottom surface 5b (see FIG. 2) of the spare pan 5. Thus, the spare pan 5 is also supported by the cross member 10.

Spring supporting parts 11,11 (see FIG. 3) for supporting suspensions (not shown, and will not be shown hereinafter) of right and left rear wheels are integrally provided at the right and left ends of the cross member 10, respectively. The tank frames 30, 30 are connected in the vicinity of the center (in the vicinity of the lower center part) of the cross member 10 in the right-left directions. As shown in FIG. 3, the part where the tank frames 30, is connected also includes lower arm supporting parts 12, 12 as suspension mounting parts to which lower arms (not shown) of the right and left rear wheels are connected. In the embodiment, the front ends of the spare pan frames 20A, 20B are connected in the vicinity of the lower arm supporting parts 12, 12. In other words, the lower arm supporting parts 12, 12 are positioned on lines respectively extending from the axis lines of the spare pan frames 20A, 20B in the longitudinal direction in a bottom surface view.

Figure 6A:
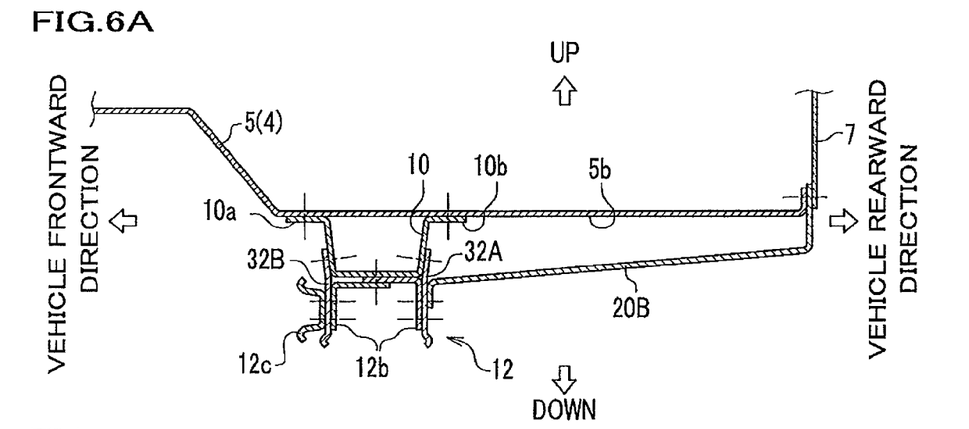
FIG. 6A is a cross sectional view of the rear vehicle body structure along D-D line in FIG. 1.

With reference to FIG. 6A, a welded structure around the lower arm supporting parts 12, 12 of the cross member 10 is described. As shown in FIG. 6A, the cross member 10 is welded to the bottom surface 5b of the spare pan 5, and forms a closed cross section. The lower arm brackets 32A, 32B are welded to the cross member 10 via the bracket stiffeners 12b, 12b. Furthermore, a front side bracket 12c is welded to the front side of the lower arm bracket 32B.

The pair of right and left tank frames 30, 30 are composed of hollow members which are plate-shaped or flat. As shown in FIG. 1, rear ends 30a, 30a are connected in the vicinity of the center of the cross member 10 in the right-left direction of the vehicle body, and front ends 30b, 30b are connected to side sills S, S which are disposed on the front sides of the ends of the curved parts of the rear frames 2, 2. Thus, each of the pair of right and left tank frames 30, 30 extends in the front right direction or front left direction of the vehicle body from the cross member 10. In the embodiment, the middle cross member 3 is connected between the side sills S, S, and the pair of right and left tank frames 30, 30 and the middle cross member 3 forms a triangle component whose base is the middle cross member 3. Thus, the rigidity between the cross member 10 and the middle cross member 3 is enhanced.

Figure 6B:
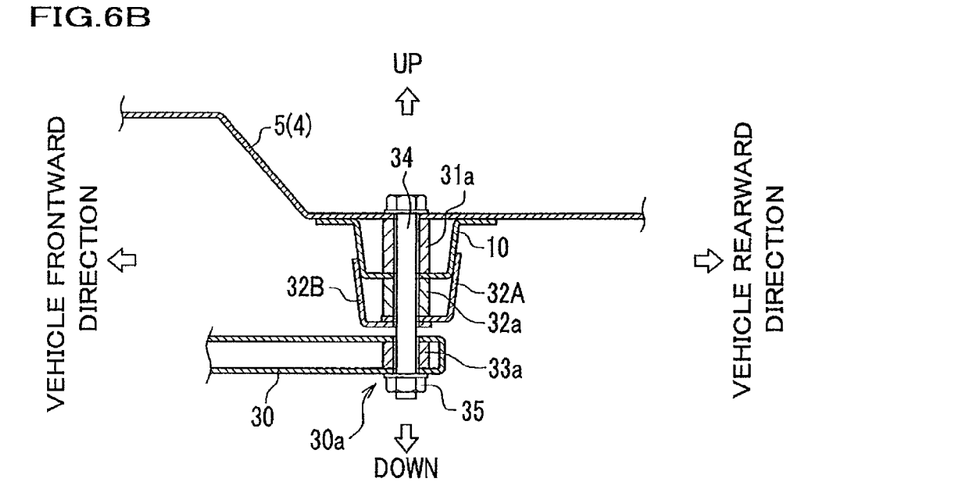
FIG. 6B is a cross sectional view of the rear vehicle body structure along E-E line in FIG. 1.
Figure 6C:
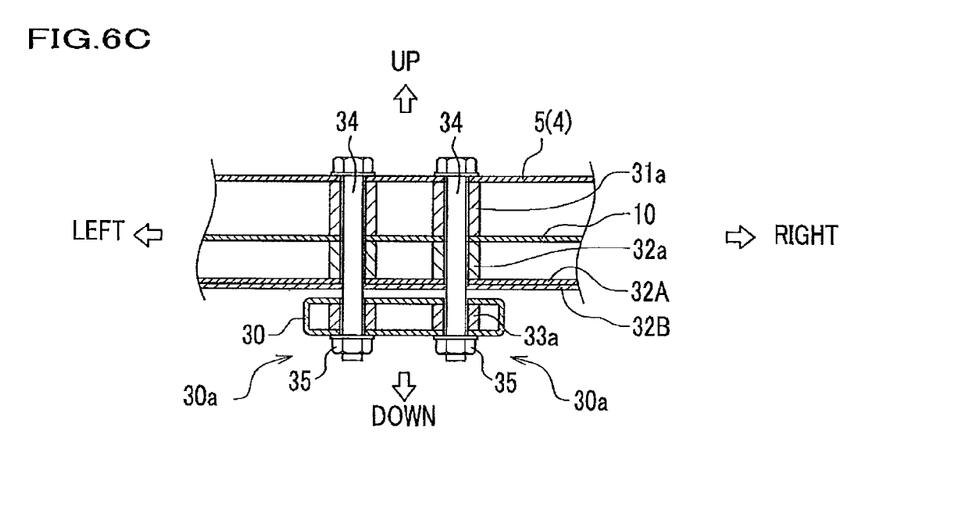
FIG. 6C is a cross sectional view of the rear vehicle body structure along F-F line in FIG. 1.

As shown in FIGS. 6B and 6C, the pair of right and left tank frames 30, is fixed to the cross member 10 by fastening their rear ends 30a, 30a to the cross member 10 with bolts 34 and nuts 35. To be more specific, the lower arm brackets 32A, 32B are welded to the lower part of the cross member 10, and the pair of right and left tank frames 30, 30 are connected below the lower arm brackets 32A, 32B with the bolts 34 and the nuts 35. The bolts 34 have a length to go through the cross member 10, the lower arm brackets 32A, 32B and the tank frame 30. The bolts 34 are inserted through the cross member 10, the lower arm brackets 32A, 32B and the tank frame 30 with collars 31a, 32b, 33a interposed around the bolts 34.

Figure 7:
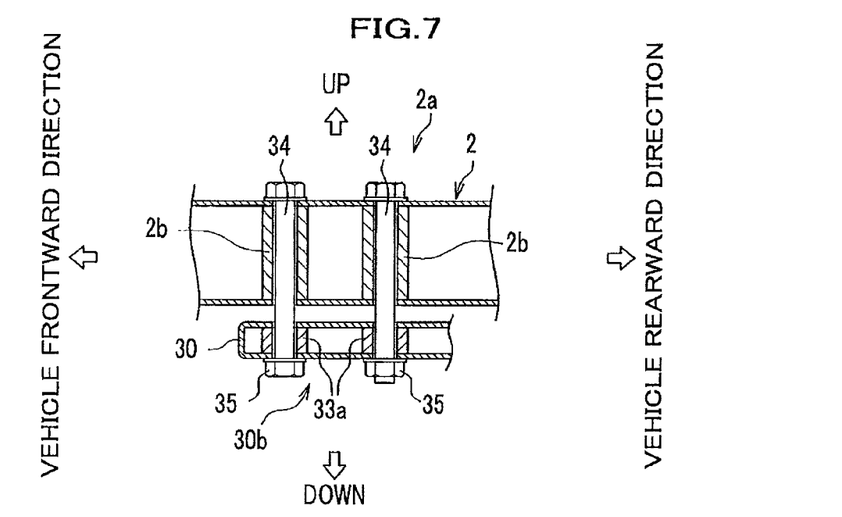
FIG. 7 is a cross sectional view of the rear vehicle body structure along G-G line in FIG. 1.

Each of the front ends 30b, 30b of the pair of right and left tank frames 30, 30 are respectively connected to each side sill S by fastening the two bolts 34, 34 which are arranged in the longitudinal direction with the nuts 35, 35 as shown in FIG. 7. Collars 2b, 33a are interposed around the bolts 34. The front ends 30b, 30b of the pair of right and left tank frames 30, 30 may be connected to the rear frames 2, 2.

A fuel tank T (see FIG. 11) is disposed on the pair of right and left tank frames 30, 30 connected as above, and is supported and fixed by belt members or bolts which are not shown.

The spare pan frames 20A (20B) and the pair of right and left tank frames 30, 30 are positioned on a substantially straight line via the cross member 10 in the front-rear direction of the vehicle body in a side view as shown in FIG. 2.

Preferable positional relations of the spare pan frames 20A, 20B and the pair of right and left tank frames 30, 30 to the cross member 10 seen from the bottom surface are explained with reference to FIG. 8. The symbol L1 in FIG. 8 indicates a width dimension of the vehicle 1, the symbol L2 indicates the dimension from the left side surface of the vehicle 1 to the right side of the spare pan frame 20B, and the symbol L3 indicates the dimension from the right side surface of the vehicle 1 to the left side of the spare pan frame 20A.

Figure 8:
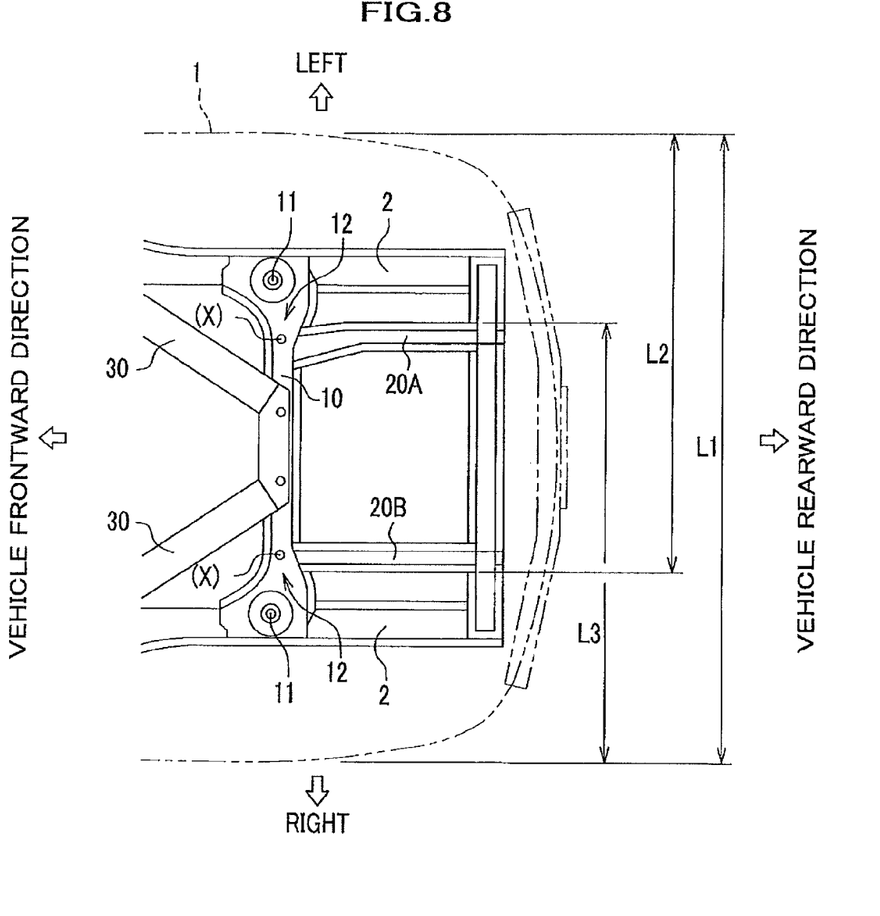
FIG. 8 is an illustration showing preferable positional relations between spare pan frames and a pair of right and left tank frames relative to a cross member that are seen from a bottom surface.

As shown in FIG. 8, the ratios of L1 to L2 and L1 to L3 are both set to be within the range of from 100:50 to 100:70.

By setting the ratios of L1 to L2 and L1 to L3 as described above, it is possible to arrange the connection positions of the spare pan frames 20A, 20B to the cross member 10 to be closer to the spring supporting parts 11,11 of the cross member 10.

The preferable positional relations of the spare pan frames 20A, 20B and the pair of right and left tank frames 30, 30 to the cross member 10 seen from the bottom surface is explained below in another perspective. The positions of the cross member 10 where the spare pan frames 20A, 20B are connected (X), (X) are both in the vicinity of the lower arm supporting parts 12, 12 (see FIG. 3).

This configuration allows to enhance the supporting rigidity of the lower arms.

Figure 9:
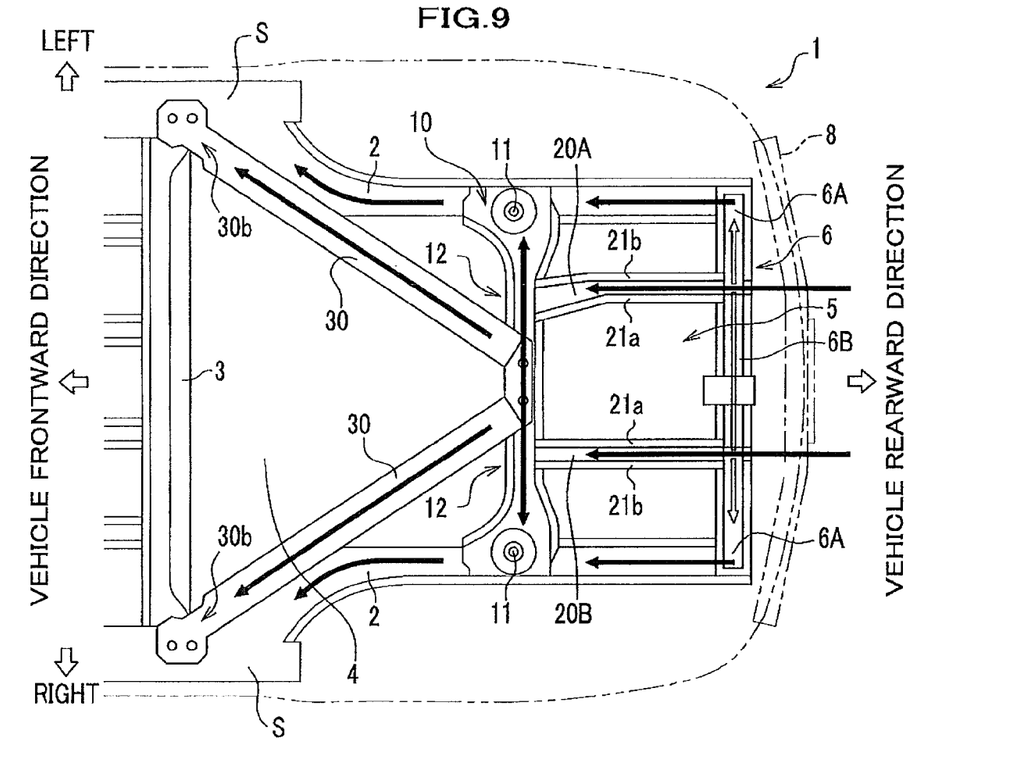
FIG. 9 is an illustration for showing the transfer of a load input at the time of rear end collision.
Figure 10:
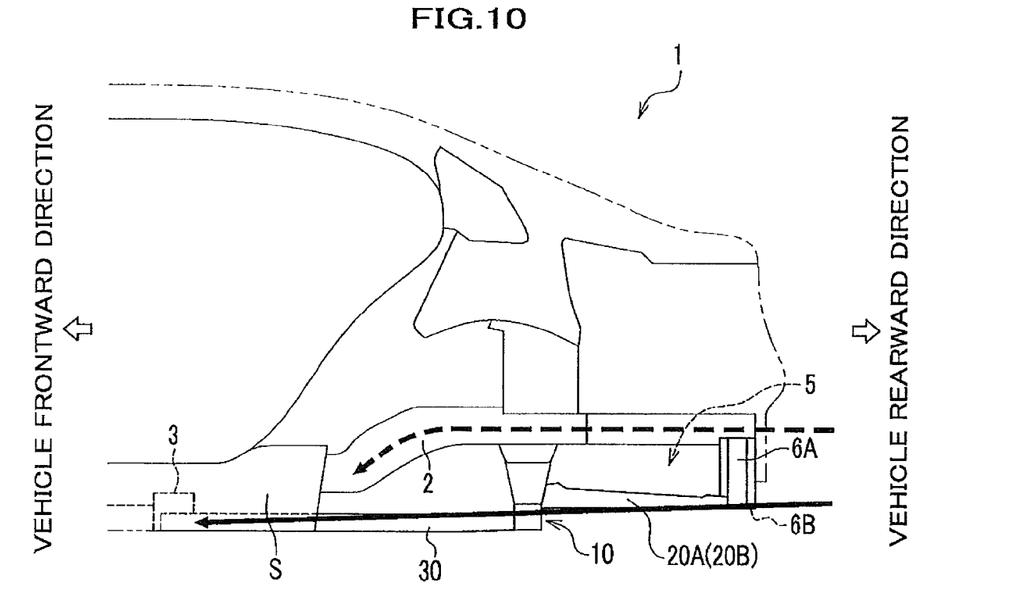
FIG. 10 is an illustration for showing the transfer of a load input at the time of rear end collision.

Next, the behavior of the rear vehicle body structure when a load is applied to the vehicle body at the time of rear end collision is explained referring to FIGS. 9 and 10.

As shown in FIGS. 9 and 10, if a load indicated by the arrows in FIGS. 9 and 10 are applied, at the time of rear end collision, to the spare pan frames 20A, 20B through the bumper beam 8 and the rear end part 6, the applied load is transferred to the cross member 10 through the spare pan frames 20A, 20B while the applied load is transferred to the rear frames 2, 2 through the rear end part 6. The applied force transferred to the cross member 10 is further transferred to the side sills S, S through the pair of right and left tank frames 30, 30, each of which extends in the front right direction or front left direction of the vehicle body from the vicinity of the center part of the cross member 10 in the right-left directions of the vehicle body.

Thus, a load applied at the time of rear end collision is efficiently dispersed and transferred frontward from the rear part of the vehicle body, which allows to enhance the absorbing efficiency of energy generated at the time of the rear end collision.

Since the cross member 10 is connected to the right and left rear frames 2, 2 at the right and left ends thereof, the input load transferred to the cross member 10 through the spare pan frames 20A, 20B is also dispersed to the rear frames 2, 2. Therefore, the load generated at the time of rear end collision is efficiently dispersed and transferred.

The spare pan frames 20A, 20B extend rearward of the cross member 10, and the pair of right and left tank frames 30, 30 extend frontward of the cross member 10. Thus, the cross member 10 is reinforced by the spare pan frames 20A, 20B and the pair of right and left tank frames 30, 30, which enhances the rigidity of the cross member 10. This configuration also allows to enhance the rigidity of the lower arm supporting parts 12, 12 which are provided to the cross member 10.

As shown in FIG. 10, the spare pan frames 20A, 20B and the pair of right and left tank frames 30, 30 are positioned on a substantially straight line via the cross member 10 in the front-rear direction of the vehicle body in a side view. Thus, a load applied at the time of rear end collision can be smoothly dispersed and transferred frontward from the rear part of the vehicle body.

If the rear vehicle body structure does not include the spare pan frames 20A, 20B and the pair of right and left tank frames 30, 30, a transfer path of a load input at the time of rear end collision is the path that goes through the rear frames 2, 2 (only one rear frame is shown) as indicated by the bold dashed line in FIG. 10. To be more specific, since the input load is transferred to the front part of the vehicle body from the rear part of the vehicle body through the rear frames 2, 2 that include the curbed portions, the input load is difficult to be transferred straight, which reduces the transfer efficiency of the input load.

In contrast, the spare pan frames 20A, 20B and the pair of right and left tank frames 30, 30 are positioned in the substantially straight line in the front-rear direction of the vehicle body via the cross member 10 in a side view in the embodiment as described above, the input load is smoothly dispersed and transferred, which enhances the energy absorption effect at the time of the rear end collision.

In accordance with the above described embodiment, a load input at the time of rear end collision is transferred to the cross member 10 through the spare pan frames 20A, 20B, and is further transferred from the cross member 10 to the right and left side sills S, S through the pair of right and left tank frames 30, 30. Thus, the load generated at the time of rear end collision can be efficiently dispersed and transferred frontward from the rear part of the vehicle body, which enhances the energy absorption effect at the time of the rear end collision.

Furthermore, because the cross member 10 is reinforced by the spare pan frames 20A, 20 and the pair of right and left tank frames 30, 30, the rigidity of the cross member 10 is enhanced, which also enhances the rigidity of the lower arm supporting parts 12, 12 of the cross member 10.

Moreover, a load input at the time of rear end collision is smoothly dispersed and transferred frontward from the rear part of the vehicle body because the spare pan frames 20A, 20B and the pair of right and left tank frames 30, 30 are positioned in the substantially straight line via the cross member 10 in the front-rear direction of the vehicle body in the side view. Thus, the energy absorption effect at the time of rear end collision is further enhanced.

Further, deformation of the vehicle body in the front-rear direction of the vehicle body can be preferably suppressed, which enhances the rigidity of the lower arm supporting parts 12, 12 of the cross member 10.

A load input at the time of rear end collision is smoothly dispersed and transferred frontward from the rear part of the vehicle body because the spare pan frames 20A, 20B are provided on both right and left sides of the spare pan 5. Thus, the energy absorption effect at the time of the rear end collision can be further enhanced.

This also allows to preferably suppress the deformation of the rear vehicle body structure in the front-rear direction of the vehicle body, whereby the rigidity of the lower arm supporting parts 12, 12 can be further enhanced.

Because the spare pan frames 20A, 20B support the spare pan 5 from the outer bottom surface, or the spare pan frames 20A, 20B are disposed on the lower part of the side portions 5*a*, the offset amount between the spare pan frames 20A, 20B and the pair of right and left tank frames 30, 30 in the upper and lower direction can be made smaller. Thus, a load input at the time of rear end collision can be smoothly dispersed and transferred frontward from the rear part of the vehicle body, whereby the energy absorption effect at the time of rear end collision can be further enhanced.

Figure 11:
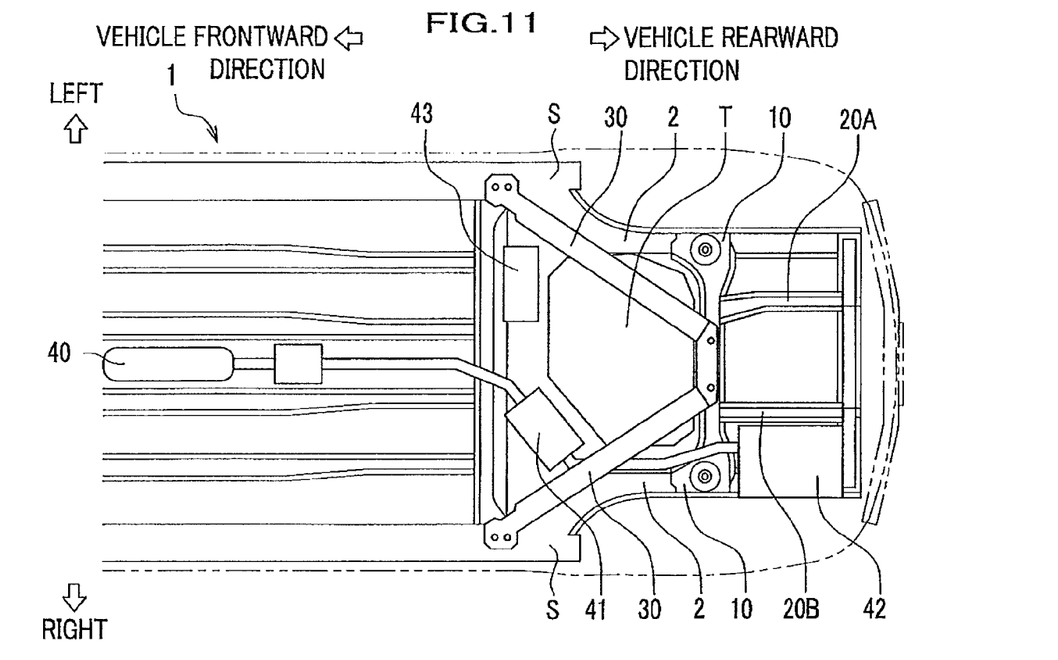
FIG. 11 is an illustration for showing a layout of the bottom surface of the vehicle body.

The embodiment according to the present invention has been described as above, however, the present invention is not limited to this, and various modifications can be made as appropriate without departing from the spirit of the invention. For example, FIG. 11 is a schematic view showing the bottom surface of the vehicle 1 to which the rear vehicle body structure is applied. Disposed on the bottom surface of the vehicle body 1 are a catalytic converter 40, a chamber 41 and a muffler 42 as members for an exhaust system, and a canister 43 as a member for an induction system. A layout or shapes of these members can be changed by changing the position where the pair of right and left tank frames 30, 30 are connected.

Figure 12:
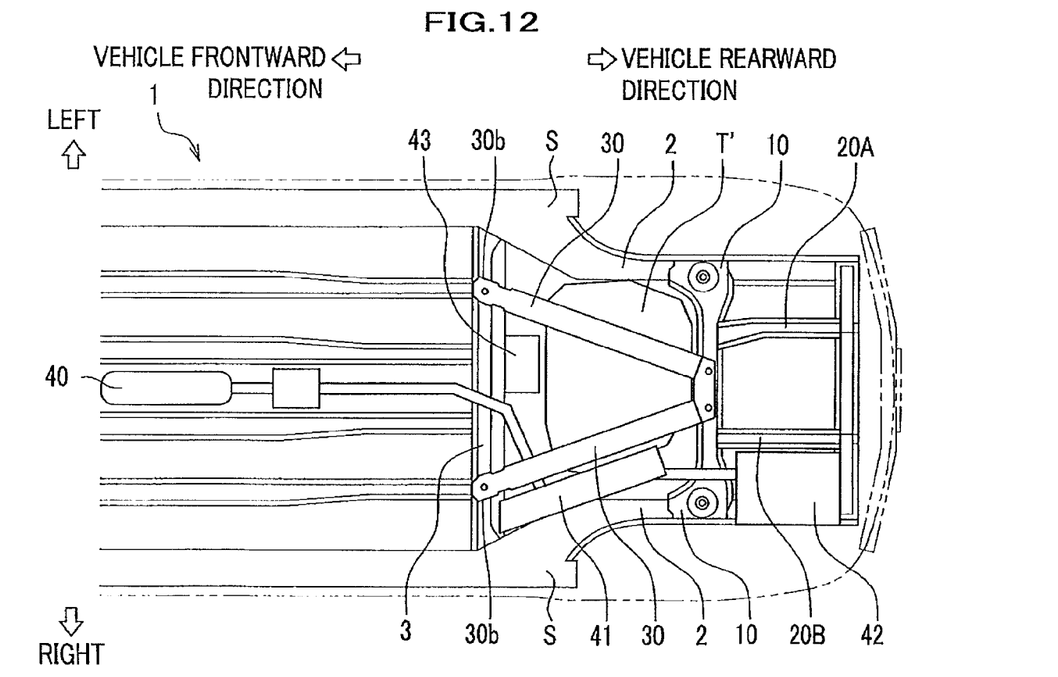
FIG. 12 is an illustration showing a layout of the bottom surface of a vehicle body of a modification of the embodiment.

An example of a vehicle body structure is described in which the connection position of the pair of right and left tank frames 30, 30 is changed, with reference to FIG. 12. In the example, the front end portions 30b, 30b of the pair of right and left tank frames 30, 30 are connected to a middle cross member 3 which is connected between the right and left side sills S, S, as a front cross member. Thus, the pair of right and left tank frames 30, 30 are connected to the side sills S, S via the middle cross member 3. Floor frames 3a are connected to the positions corresponding to the connection positions of the pair of right and left tank frames 30, 30 to the middle cross member 3.

In the above described configuration, if a load is input to the spare pan frames 20A, 20B from the rear end part 6 at the time of rear end collision, the input load is transferred to the cross member 10 through the spare pan frames 20A, 20B, and is further transferred to the middle cross member 3 from the cross member 10 through the pair of right and left tank frames 30, 30. The input load is then transferred to the side sills S, S from the middle cross member 3.

The input load transferred to the middle cross member 3 through the pair of right and left tank frames 30, 30 is also transferred to the floor frames 3a, 3a.

Thus, the load generated at the time of the rear end collision is efficiently dispersed and transferred frontward from the rear part of the vehicle body, which allows to enhance the energy absorbing effect at the time of the rear end collision.

In the above described configuration, the connection positions of the pair of right and left tank frames 30, 30 can be made closer to the center of the vehicle body because the pair of right and left tank frames 30, 30 are connected to the middle cross member 3. This allows to increase the degree of freedom of a layout of the above described members that are disposed in the rear part of the vehicle body. In the example, it is possible to dispose the chamber 41 in a right or left side space that is made by changing the connection position of the pair of right and left tank frames 30, 30 to be closer to the center of the vehicle body. This further makes it possible to increase the capacity of the chamber 41.

Figure 13A:
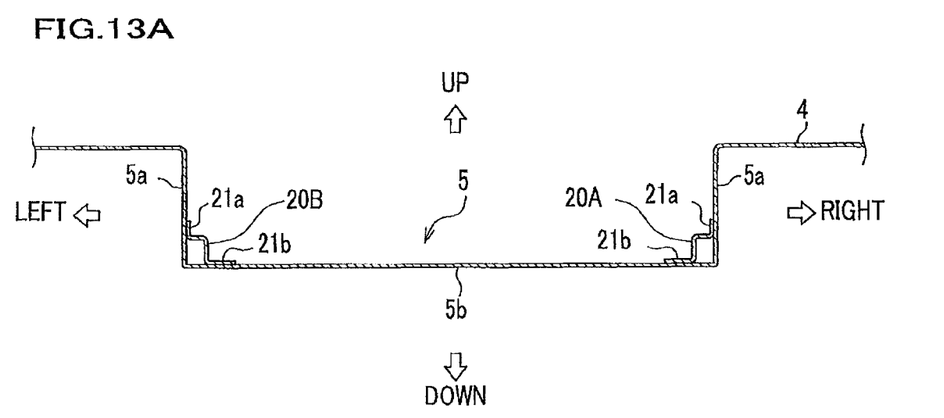
FIGS. 13A to 13C are cross sectional views showing positions to which spare pan frames are fixed.
Figure 13B:
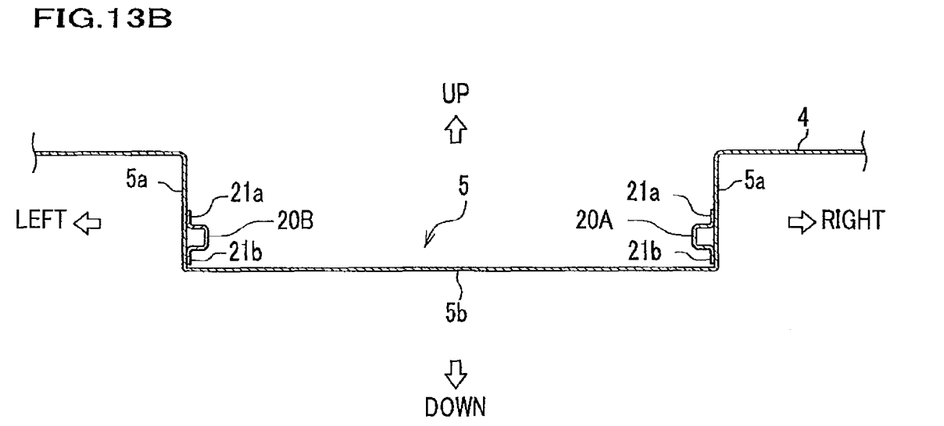
Figure 13C:
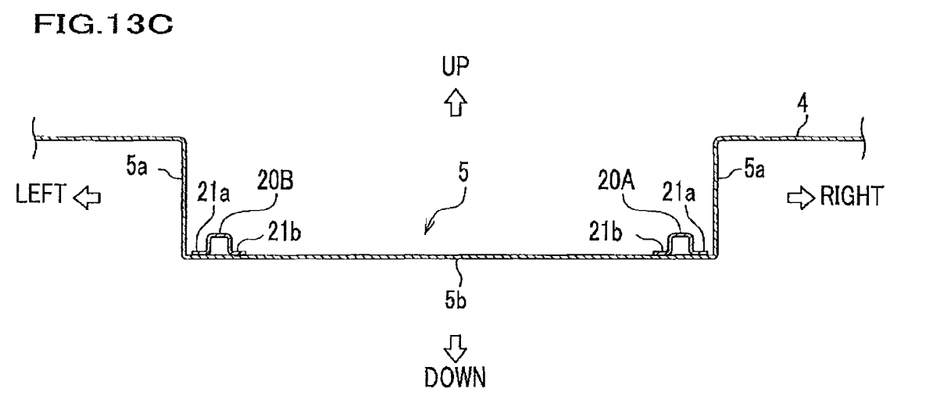

As shown in FIGS. 13A to 13C, the spare pan frames 20A, 20B may be disposed and fixed to the inner surface of the spare pan 5.

In the example of FIG. 13A, the spare pan frames 20A, 20B are disposed over edges of the inner surface of the spare pan 5. In the example of FIG. 13B, the spare pan frames 20A, 20B are fixed to the lower parts of the side portions 5a of the spare pan 5. In the example of FIG. 13C, the spare pan frames 20A, 20B are fixed to the bottom surface 5b of the spare pan 5.

In all the above examples, because the spare pan frames 20A, 20B are disposed on the inner surface of the spare pan 5, the amount the vehicle body protrudes downward can be made smaller, which improves aerodynamic characteristics. This configuration also makes it possible to ensure the minimum ground clearance easily.

In the examples shown in FIGS. 13B and 13C, the weld directions of the flange portions 21a, 21b are the same, and thus workability of welding is enhanced.

The spare pan frames 20A, 20B, the cross member 10, the pair of right and left tank frames 30, 30 and the like may be in arbitrarily determined shapes, and may take various shapes.

What is claimed is:

1. A rear vehicle body structure comprising:
   a cross member which is connected between right and left rear frames extending in the front-rear direction of a vehicle body, the cross member being provided with suspension mounting parts for supporting suspensions of right and left rear wheels;
   spare pan frames for supporting a spare pan, the spare pan frames being connected to the cross member and extending rearward of the vehicle body from the cross member; and
   a pair of right and left tank frames which is connected in the vicinity of a center portion of the cross member in the right and left direction of the vehicle body, each of the pair of right and left tank frames extending in the vehicle front-right direction or the vehicle front-left direction from the cross member and being connected to a right or left floor frame or a right or left side sill.

2. The rear vehicle body structure according to claim 1, wherein the spare pan frames and the pair of right and left tank frames are disposed on a substantially straight line via the cross member in the vehicle front-rear direction in a side view.

3. The rear vehicle body structure according to claim 1, wherein the spare pan frames are provided on both right and left sides of the spare pan.

4. The rear vehicle body structure according to claim 1, wherein the spare pan frames support the spare pan from outside of the spare pan.

5. The rear vehicle body structure according to claim 1, wherein the spare pan frames and the pair of right and left tank frames are disposed on a substantially straight line via the cross member in the vehicle front-rear direction in a side view, and the spare pan frames support the spare pan from an outer bottom surface of the spare pan.

6. The rear vehicle body structure according to claim 1, wherein connection positions of the spare pan frames to the cross member correspond to lower arm supporting positions as suspension mounting parts.

7. The rear vehicle body structure according to claim 1, wherein front ends of the pair of right and left tank frames are connected to a floor cross member which is connected between the right and left rear frames or side sills, and the pair of right and left tank frames are connected to the right and left rear frames or side sills via the floor cross member.

8. The rear vehicle body structure according to claim 7, wherein floor frames are connected to positions corresponding to the connection positions of the pair of right and left tank frames to the cross member.

9. The rear vehicle body structure according to claim 1, wherein rear ends of the spare pan frames are connected to a rear end part in which a rear end cross member and a rear end outrigger are integrally connected.

10. The rear vehicle body structure according to claim 2, wherein the spare pan frames are provided on both right and left sides of the spare pan.

* * * * *